Patented May 16, 1939

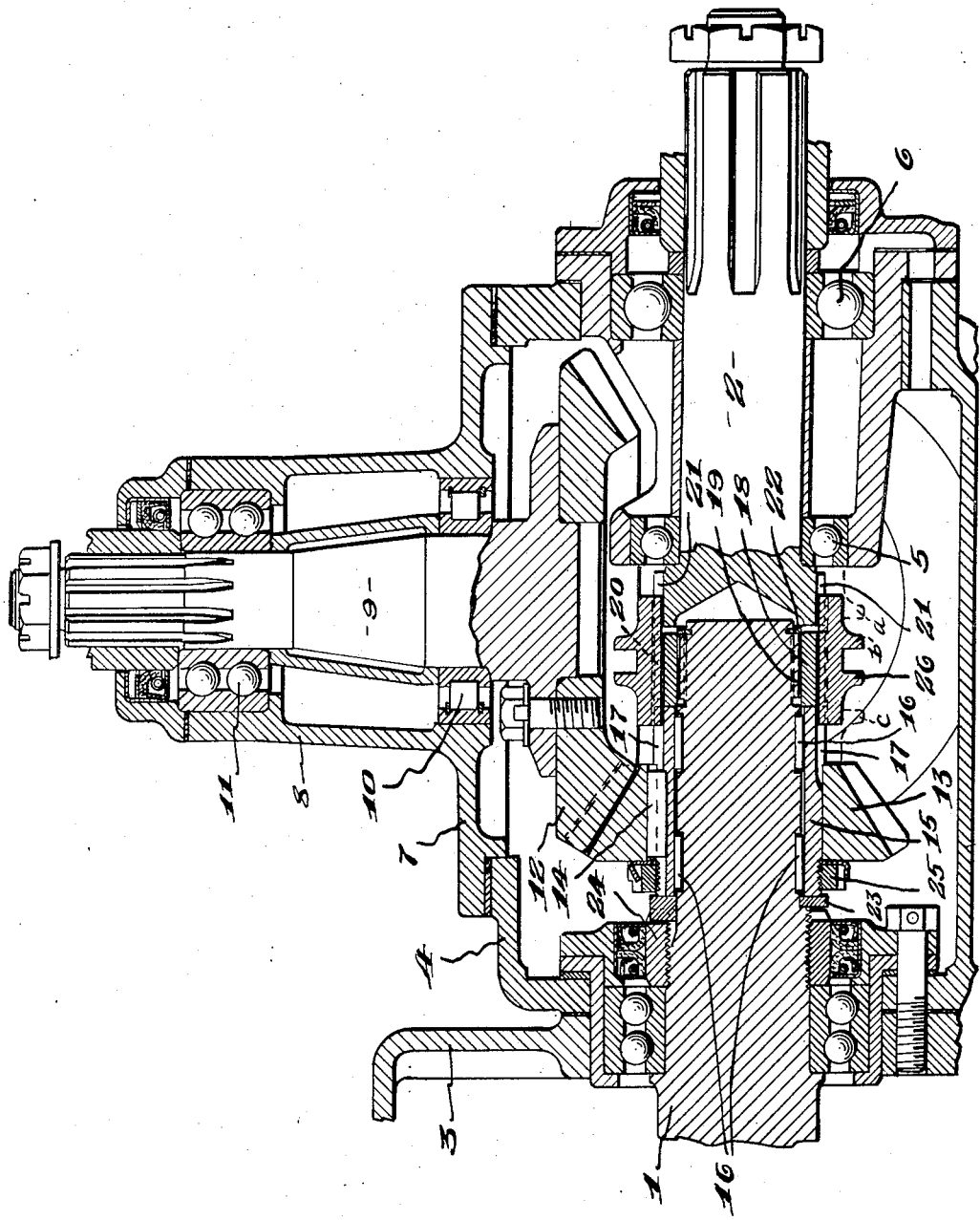

2,158,483

UNITED STATES PATENT OFFICE 2,158,483

POWER TAKE-OFF FOR MOTOR VEHICLES

Carl D. Peterson, Toledo, Ohio, assignor to Spicer Manufacturing Corporation, Toledo, Ohio, a corporation of Virginia Application June 30, 1937, Serial No. 151,256

1 Claim. (Cl. 74—11)

This invention relates to power take-offs for motor vehicles and has for its object a particularly simple, compact, durable and efficient power take-off by which the vehicle may be operated through all the various speed changes of a transmission gear without using the power take-off, or through the various gear changes with the power take-off in operation, or when the vehicle is at a standstill with only the power take-off running.

The invention consists in the novel features and in the combinations and constructions hereinafter set forth and claimed.

In describing this invention, reference is had to the accompanying drawing which is a transverse sectional view through the drive mechanism embodying this invention, of a motor vehicle with the adjacent portion of the change speed gear box being also shown.

In the illustrated embodiment of the invention, the power take-off is shown as attached to the rear end of the gear box, but it is understood that it may be otherwise mounted or mounted independently of the gear box, that is, spaced from the gear box with a shaft between them.

The power take-off comprises generally a drive shaft which is a shaft actuated by the engine of the vehicle, a driven shaft alined with the drive shaft and connected to the driving wheels of the motor vehicle, usually through the usual propeller shaft and universal joint, not shown, and a power take-off including gears, one of which is mounted concentric with the drive shaft and normally unclutched therefrom, so that the drive shaft may rotate relatively to the gear, and a clutch including a shiftable section operable into three positions: (a) to clutch only the driving and driven shafts directly together for the purpose of driving the vehicle; (b) to clutch the drive and driven shafts directly together and also clutch the gear to rotate with the drive shaft so that the power take-off may be used, while the vehicle is in operation; and (c) into a position wherein the drive and driven shafts are unclutched and the gear only clutched to rotate with the drive shaft, so that only the power take-off is in operation, when the vehicle is idle.

1 and 2 designate respectively the drive and the driven shafts, the drive shaft being in the illustrated embodiment of my invention the output or transmission shaft of a change speed transmission gearing located in a gear box. 3 designates the rear wall of the gear box. The shaft 1 is journalled in suitable bearings in the gear box and extends through the same into a box 4 enclosing the power take-off mechanism. The drive shaft 2 is journalled in suitable spaced apart bearings 5 and 6 in the rear wall of the box 4 in end to end relation, or in axial alinement with the shaft 1 and is provided at its outer end with suitable means for coupling to a propeller shaft or to a universal joint.

The box 4 is open on one of its lateral sides and this opening is generally closed by a cover 7. The cover is formed with an outwardly extending bearing support or tower 8.

9 designates the power take-off shaft journalled in spaced apart bearings 10 and 11 in the bearing support or tower 8 and extending beyond the outer end of the same for coupling to any motion transmitting mechanism to receive power from the shaft 9.

12 is a bevel gear suitably mounted on the inner end of the power take-off shaft 9 within the box 4. 13 is a bevel gear, this being concentric with the shaft 1 to normally rotate relative to the shaft or permit the shaft to rotate relatively to the gear. The gear 11 is here shown as keyed at 14 to a sleeve 15 on the shaft 1, suitable antifriction bearings 16 being interposed between the shaft 1 and the sleeve 15. The sleeve is provided with clutch teeth 17. 18 is a ring or sleeve mounted on the inner end of the shaft 1 and abutting against the end of the sleeve 17, this being keyed or splined or otherwise secured to the shaft 1 at 19 to rotate therewith and having clutch teeth 20 located to come in alinement with the teeth 17. 21 are external clutch teeth porvided on a head at the inner end of the driven shaft 2. The sleeve 15 abuts at one end against the ring 18 which is held from axial displacement in any suitable manner, as by a retaining or lock ring 22. The sleeve 15 thrust at its other end against a lock washer or ring 23 thrusting against the inner ring 24 of an oil tight bearing, which in turn thrusts against the bearing for the shaft 1, the latter being suitably held from axial displacement. The gear 13 thrusts against the ends of the clutch teeth on the sleeve 15 and against a lock nut 25 on the sleeve 15.

26 designates a shiftable clutch section slidably splined on the ring 18 or having internal teeth complemental to the clutch teeth 20 of the ring 18, the clutch section being shiftable into three positions, in one position, to the right, designated (a) so that it clutches only the ring 18, and hence the shaft 1 to the driven shaft 2, or in such position that the clutch teeth or splines of the clutch section 26 engage only with the teeth 20 of the ring 18, and the teeth 21 of the shaft 2; and into another position, that shown in the drawing and designated (b) in which the clutch teeth of the shiftable section 26 are engaged with both the clutch teeth of the ring 18 and the clutch teeth 21 of the shaft 2; and into a third position designated (c) in which the clutch teeth of the section 25 are interlocked with those of the ring 18 and the teeth 17 of the sleeve 15, which sleeve is keyed to the bevel gear 13. The clutch section 26 is shifted in any suitable manner, it being provided with a groove for receiving a fork which is actuated in any well-known manner, as by a shifting lever.

The opening, closed by the cover 7, is of sufficient diameter to permit the bevel gear 12 to pass therethrough or to permit this gear to be lifted out, when the cover is removed.

In operation, when driving the vehicle along normally with the power take-off disconnected, the shiftable section 26 is shifted from the right into the position shown in the drawing, and when it is desired to both drive the vehicle and the power take-off, the clutch section 26 is shifted into intermediate position, shown in the drawing, and when the power take-off is to be used when the vehicle is standing still, the shiftable section is shifted completely to the left in the dotted line position c.

What I claim is:

In a power take-off for motor vehicles, the combination of a drive shaft actuated from the engine of the vehicle, a driven shaft alined therewith for connection to the propeller shaft of the vehicle, a power take-off including a train of gears and a shiftable clutch section operable to connect the gears to the drive shaft, a sleeve on the drive shaft in which the drive shaft is normally rotatable, the sleeve being formed with clutch teeth at one end, a ring keyed to the drive shaft against which said end of the former sleeve thrusts, the ring being formed with clutch teeth, the driven shaft being formed at its end opposed to the drive shaft with clutch teeth, one of said train of gears being mounted on the sleeve and keyed thereto, and suitable means for holding the sleeve and the gear on the sleeve from axial displacement, said shiftable clutch section having teeth for interlocking with said three sets of clutch teeth and shiftable into one position to clutch the drive and driven shafts through said ring directly together; and into a second position to clutch the sleeve through the clutch teeth thereon to the drive shaft through said ring and the driven shaft to the drive shaft through said ring; and into a third position to clutch only the gear on the sleeve to the drive shaft through the ring.

CARL D. PETERSON.